(12) United States Patent
Yamada et al.

(10) Patent No.: US 12,012,172 B2
(45) Date of Patent: Jun. 18, 2024

(54) SADDLE RIDING TYPE VEHICLE

(71) Applicant: HONDA MOTOR CO., LTD., Tokyo (JP)

(72) Inventors: Shinichi Yamada, Wako (JP); Kenichi Maeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 695 days.

(21) Appl. No.: 17/264,352

(22) PCT Filed: May 17, 2019

(86) PCT No.: PCT/JP2019/019778
§ 371 (c)(1),
(2) Date: Jan. 29, 2021

(87) PCT Pub. No.: WO2020/031456
PCT Pub. Date: Feb. 13, 2020

(65) Prior Publication Data
US 2021/0291928 A1    Sep. 23, 2021

(30) Foreign Application Priority Data

Aug. 9, 2018  (JP) ................................. 2018-150585

(51) Int. Cl.
*B62K 19/38*    (2006.01)
*B62L 3/04*    (2006.01)

(52) U.S. Cl.
CPC ................ *B62K 19/38* (2013.01); *B62L 3/04* (2013.01)

(58) Field of Classification Search
CPC ............ B62K 19/30; B62K 19/38; B62L 3/04
See application file for complete search history.

(56) References Cited

U.S. PATENT DOCUMENTS 8,439,455 B2 * 5/2013 Hayashi ................ B60T 7/042
303/119.3
2008/0079310 A1 * 4/2008 Yamakura ............ B60T 8/3685
303/115.4

(Continued)

FOREIGN PATENT DOCUMENTS

CN        102039963 A    5/2011
EP        3141464 A1    3/2017

(Continued)

OTHER PUBLICATIONS

Chinese Office Action with English translation dated Sep. 14, 2021, 17 pages.

(Continued)

*Primary Examiner* — Tony H Winner
(74) *Attorney, Agent, or Firm* — Rankin, Hill & Clark LLP (57) ABSTRACT

A saddle riding type vehicle in which a braking force adjustment device, a master cylinder and a reserve tank can be compactly arranged. In the saddle riding type vehicle having a braking force adjustment device that controls braking force of a vehicle wheel, a master cylinder for a rear wheel that outputs brake hydraulic pressure in response to operation of a brake pedal, and a reserve tank that stores brake fluid for the master cylinder for the rear wheel, in a vehicle side view, the reserve tank is disposed above the master cylinder for the rear wheel, and the braking force adjustment device is provided between the master cylinder for the rear wheel and the reserve tank.

8 Claims, 4 Drawing Sheets

(56) References Cited

U.S. PATENT DOCUMENTS

| | | | | |
|---|---|---|---|---|
| 2010/0071985 A1* | 3/2010 | Harada | ................ | B60T 8/3685 |
| | | | | 180/219 |
| 2011/0031054 A1* | 2/2011 | Matayoshi | ............ | B60T 8/3685 |
| | | | | 180/227 |
| 2012/0187654 A1* | 7/2012 | Kawai | .................... | B62K 19/30 |
| | | | | 280/288.4 |
| 2013/0009378 A1 | 1/2013 | Nagakubo et al. | | |
| 2015/0329166 A1 | 11/2015 | Tsubone et al. | | |
| 2017/0008600 A1* | 1/2017 | Kitagawa | ................ | B62K 19/38 |
| 2019/0202521 A1* | 7/2019 | Yamamoto | ............ | B60T 8/3685 |

FOREIGN PATENT DOCUMENTS

| | | |
|---|---|---|
| JP | S63-166681 A | 7/1988 |
| JP | 2-128986 A | 5/1990 |
| JP | H07-144676 A | 6/1995 |
| JP | 2002-211471 A | 7/2002 |
| JP | 2007-055297 A | 3/2007 |
| JP | 2009-179260 A | 8/2009 |
| JP | 2011-037355 | 2/2011 |
| JP | 2011-51417 A | 3/2011 |
| JP | 2011-88573 A | 5/2011 |
| JP | 2011-195024 | 10/2011 |
| JP | 2012-136124 | 7/2012 |
| JP | 2016-11089 A | 1/2016 |

OTHER PUBLICATIONS

European Search Report dated Sep. 6, 2021, 9 pages.
International Preliminary Report on Patentability dated Feb. 18, 2021, 6 pages.
Indian Office Action dated Feb. 8, 2022, Application No. 202117006268, 5 pages.
Japanese Office Action dated Mar. 1, 2022, Application No. 2020536333, w/English translation, 9 pages.
Indonesian Office Action dated Jan. 4, 2022, Application No. P-00 2021 01602; English translation included, 8 pages.
International Search Report, Date of mailing: Jul. 30, 2019 (Jul. 30, 2019), 1 page.
Written Opinion of the International Searching Authority dated Jul. 31, 2019 filed in PCT/JP2019/019778, 3 pages.
Japanese Office Action with English translation, Application No. JP 2020-536333, dated Dec. 14, 2021, 13 pages.
Brazilian Office Action dated Jul. 18, 2023, Application No. BR112021000570-6; Engilsh translation included, 5 pages.

* cited by examiner

SADDLE RIDING TYPE VEHICLE

TECHNICAL FIELD

The present invention relates to a saddle riding type vehicle.

BACKGROUND ART

Heretofore, known is a saddle riding type vehicle comprising a braking force adjustment device that controls braking force of a vehicle wheel and a master cylinder that outputs brake hydraulic pressure in response to operation of a brake pedal (e.g., see Patent Literature 1). In Patent Literature 1, the braking force adjustment device and the master cylinder are arranged in a vicinity of a pivot frame.

CITATION LIST

Patent Literature

Patent Literature 1: Japanese Patent Laid-Open No. 2011

SUMMARY OF INVENTION

Technical Problem

Now, in a vicinity of such a master cylinder as described above, a reserve tank that stores brake fluid for the master cylinder is provided. In this case, it is desired that a braking force adjustment device, the master cylinder and the reserve tank can be compactly arranged.

The present invention is developed in view of the above situations, and an object thereof is to provide a saddle riding type vehicle in which a braking force adjustment device, a master cylinder and a reserve tank can be compactly arranged.

Solution to Problem

In this description, all contents of Japanese Patent Application No. 2018-150585 filed on Aug. 9, 2018 are included.

According to an aspect of the present invention, in a saddle riding type vehicle comprising a braking force adjustment device (59) that controls braking force of a vehicle wheel (2), a master cylinder (67) that outputs brake hydraulic pressure in response to operation of a brake pedal (66), and a reserve tank (70) that stores brake fluid for the master cylinder (67), in a vehicle side view, the reserve tank (70) is disposed above the master cylinder (67), and the braking force adjustment device (59) is provided between the master cylinder (67) and the reserve tank (70).

Furthermore, in the above aspect of the present invention, the master cylinder (67) may be disposed to be inclined forward, and the reserve tank (70) may be disposed in front of a rear end (67a) of the master cylinder (67).

Additionally, in the above aspect of the present invention, in a vehicle width direction, at least a part of a position where the reserve tank (70) is disposed may overlap with a position where the braking force adjustment device (59) is disposed.

Furthermore, in the above aspect of the present invention, in a vehicle width direction, at least a part of a position where the master cylinder (67) is disposed may overlap with a position where the braking force adjustment device (59) is disposed.

Additionally, in the above aspect of the present invention, the reserve tank (70) may be supported by an air cleaner (41) of an intake system (40).

Furthermore, in the above aspect of the present invention, the saddle riding type vehicle may further comprise an intake passage (43) extending forward from the air cleaner (41), and the reserve tank (70) may be provided below the intake passage (43).

Additionally, in the above aspect of the present invention, the saddle riding type vehicle may further comprise a vehicle body frame (10) including a pivot frame (19) to which a swing arm (13) that supports a rear wheel (3) is coupled, the swing arm (13) may be provided to sandwich the pivot frame (19) between right and left arm parts (13a, 13b) from the outside in a vehicle width direction, the braking force adjustment device (59) may be disposed above one (13a) of the right and left arm parts, and in the vehicle width direction, at least a part of a position where one (13a) of the arm parts is disposed may overlap with a position where the braking force adjustment device (59) is disposed.

Furthermore, in the above aspect of the present invention, the master cylinder (67) may be disposed below the braking force adjustment device (59) and outside one (13a) of the arm parts.

Additionally, in the above aspect of the present invention, the saddle riding type vehicle may further comprise a cover (46b) that overlaps with the master cylinder (67) from outside in a vehicle width direction, in the vehicle side view.

Advantageous Effects of Invention

According to an aspect of the present invention, a saddle riding type vehicle comprises a braking force adjustment device that controls braking force of a vehicle wheel, a master cylinder that outputs brake hydraulic pressure in response to operation of a brake pedal, and a reserve tank that stores brake fluid for the master cylinder, and in a vehicle side view, the reserve tank is disposed above the master cylinder, and the braking force adjustment device is provided between the master cylinder and the reserve tank. According to this configuration, in the vehicle side view, the reserve tank, the braking force adjustment device and the master cylinder are arranged to line up in an up-down direction, and hence the reserve tank, the braking force adjustment device and the master cylinder can be arranged compactly in a vehicle front-rear direction.

Furthermore, in the above aspect of the present invention, the master cylinder may be disposed to be inclined forward, and the reserve tank may be disposed in front of a rear end of the master cylinder. According to this configuration, the master cylinder can be inhibited from being projected rearward, and the master cylinder can be disposed compactly in a front-rear direction. Additionally, the reserve tank can be compactly disposed in front of the rear end of the master cylinder.

Additionally, in the above aspect of the present invention, in a vehicle width direction, at least a part of a position where the reserve tank is disposed may overlap with a position where the braking force adjustment device is disposed. According to this configuration, the reserve tank and the braking force adjustment device can be arranged compactly in the vehicle width direction. In this case, a space between a rear wheel and a subframe can look cleaner, and appearance improves more, for example, as compared with a case where the reserve tank is disposed between the rear wheel and the subframe as a seat rail.

Furthermore, in the above aspect of the present invention, in a vehicle width direction, at least a part of a position where the master cylinder is disposed may overlap with a position where the braking force adjustment device is disposed. According to this configuration, the master cylinder and the braking force adjustment device can be arranged compactly in the vehicle width direction.

Additionally, in the above aspect of the present invention, the reserve tank may be supported by an air cleaner of an intake system. According to this configuration, the reserve tank can be supported with a simple structure by use of the air cleaner.

Furthermore, in the above aspect of the present invention, the saddle riding type vehicle may further comprise an intake passage extending forward from the air cleaner, and the reserve tank may be disposed below the intake passage. According to this configuration, the reserve tank can be provided compactly by using a space below the intake passage.

Additionally, in the above aspect of the present invention, the saddle riding type vehicle may further comprise a vehicle body frame including a pivot frame to which a swing arm that supports a rear wheel is coupled, the swing arm may be provided to sandwich the pivot frame between right and left arm parts from the outside in a vehicle width direction, the braking force adjustment device may be disposed above one of the right and left arm parts, and in the vehicle width direction, at least a part of a position where one of the arm parts is disposed may overlap with a position where the braking force adjustment device is disposed. According to this configuration, the braking force adjustment device can be disposed compactly in the vehicle width direction by use of a space above one of the right and left arm parts outside the pivot frame in the vehicle width direction.

Furthermore, in the above aspect of the present invention, the master cylinder may be disposed below the braking force adjustment device, and outside one of the arm parts. According to this configuration, the master cylinder can be compactly disposed below the braking force adjustment device, and outside one of the arm parts.

Additionally, the saddle riding type vehicle may further comprise a cover that overlaps with the master cylinder from outside in the vehicle width direction, in the vehicle side view. According to this configuration, the cover can protect the master cylinder, and appearance can improve in such a manner that the master cylinder is hidden.

DESCRIPTION OF EMBODIMENTS

Hereinafter, description will be made as to an embodiment of the present invention with reference to the drawings. Note that in the description, front, rear, left, right, up and down directions are the same as those for a vehicle body unless otherwise mentioned. Furthermore, sign FR shown in the respective drawings indicates a vehicle body front, sign UP indicates a vehicle body upside, and sign LH indicates a vehicle body left.

Figure 1:
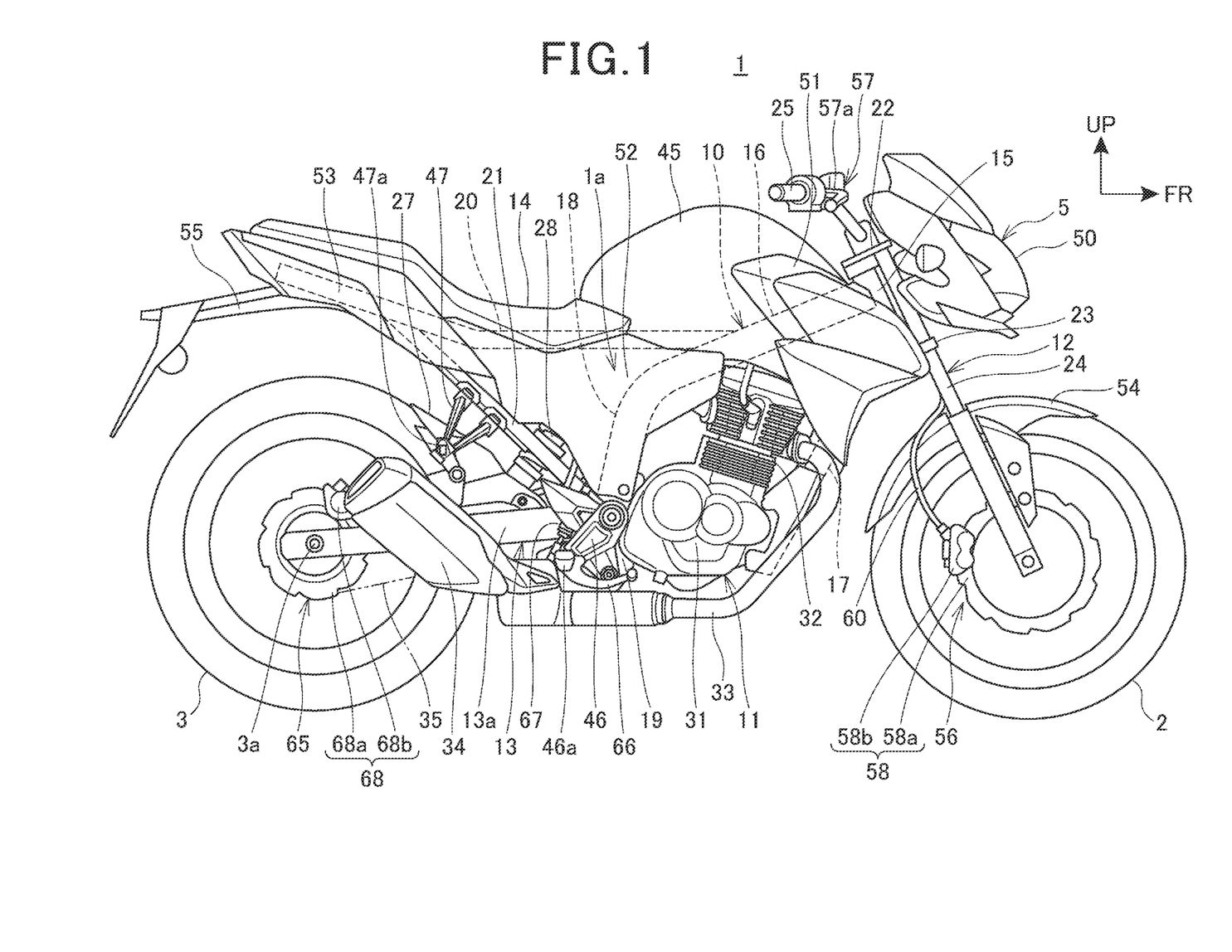
FIG. 1 is a right side view of a motorcycle according to an embodiment of the present invention.

FIG. 1 is a right side view of a motorcycle according to the embodiment of the present invention.

A motorcycle 1 is a vehicle in which an engine 11 is supported as a power unit by a vehicle body frame 10, a steering system 12 that steerably supports a front wheel 2 (a vehicle wheel) is steerably supported at a front end of the vehicle body frame 10, and a swing arm 13 that supports a rear wheel 3 is provided in a rear part of the vehicle body frame 10.

The motorcycle 1 is a saddle riding type vehicle comprising a seat 14 on which a passenger sits by straddling, the seat being provided above the rear part of the vehicle body frame 10.

The motorcycle 1 comprises a vehicle body cover 5 that covers a vehicle body such as the vehicle body frame 10.

The vehicle body frame 10 comprises a head pipe 15 provided at the front end of the vehicle body frame 10, a main frame 16 extending rearward in a downward posture from a rear part of the head pipe 15, a down frame 17 extending downward and rearward from the rear part of the head pipe 15, a center frame 18 extending downward from a rear end portion of the main frame 16, and a pivot frame 19 connected to a lower end portion of the center frame 18. Each of the main frame 16, the down frame 17 and the center frame 18 is one tubular frame, and located at a center in a vehicle width direction in the same manner as in the front wheel 2.

Furthermore, the vehicle body frame 10 comprises a pair of right and left seat frames 20 extending rearward from a rear part of the main frame 16 to a vehicle rear end portion, and a pair of right and left subframes 21 extending rearward in an upward posture from the pivot frame 19 and connected to rear parts of the seat frames 20.

The steering system 12 comprises a steering shaft (not shown) rotationally movably pivoted by the head pipe 15, a top bridge 22 fixed to an upper end of this steering shaft, a bottom bridge 23 fixed to a lower end of the steering shaft, a pair of right and left front forks 24 supported by the top bridge 22 and the bottom bridge 23, respectively, and a steering handle 25 fixed to the top bridge 22.

The front wheel 2 is pivoted by a lower end portion of each of the front forks 24.

Figure 2:
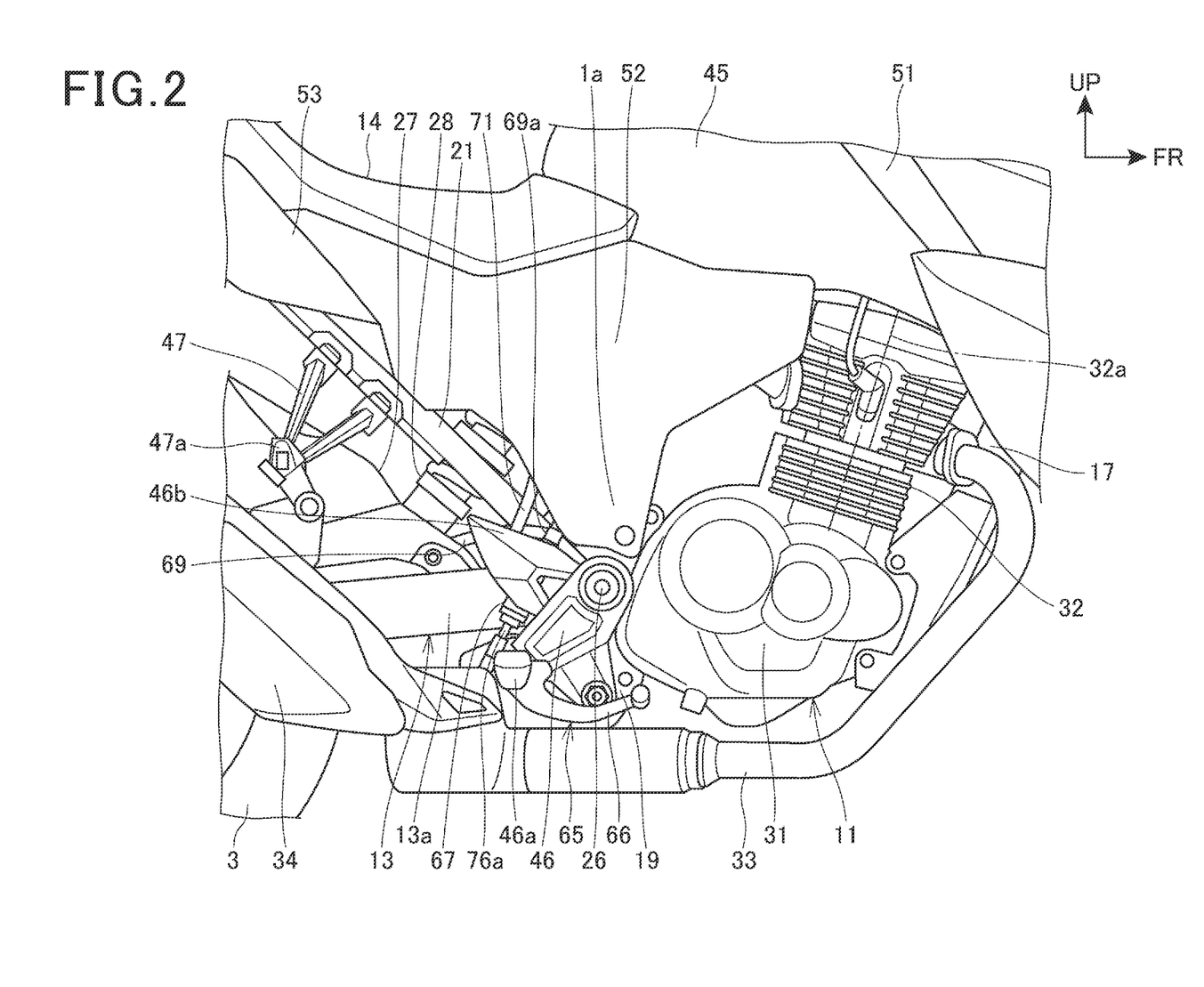
FIG. 2 is a side view of a center part of the motorcycle in a front-rear direction seen from a right side.
Figure 3:
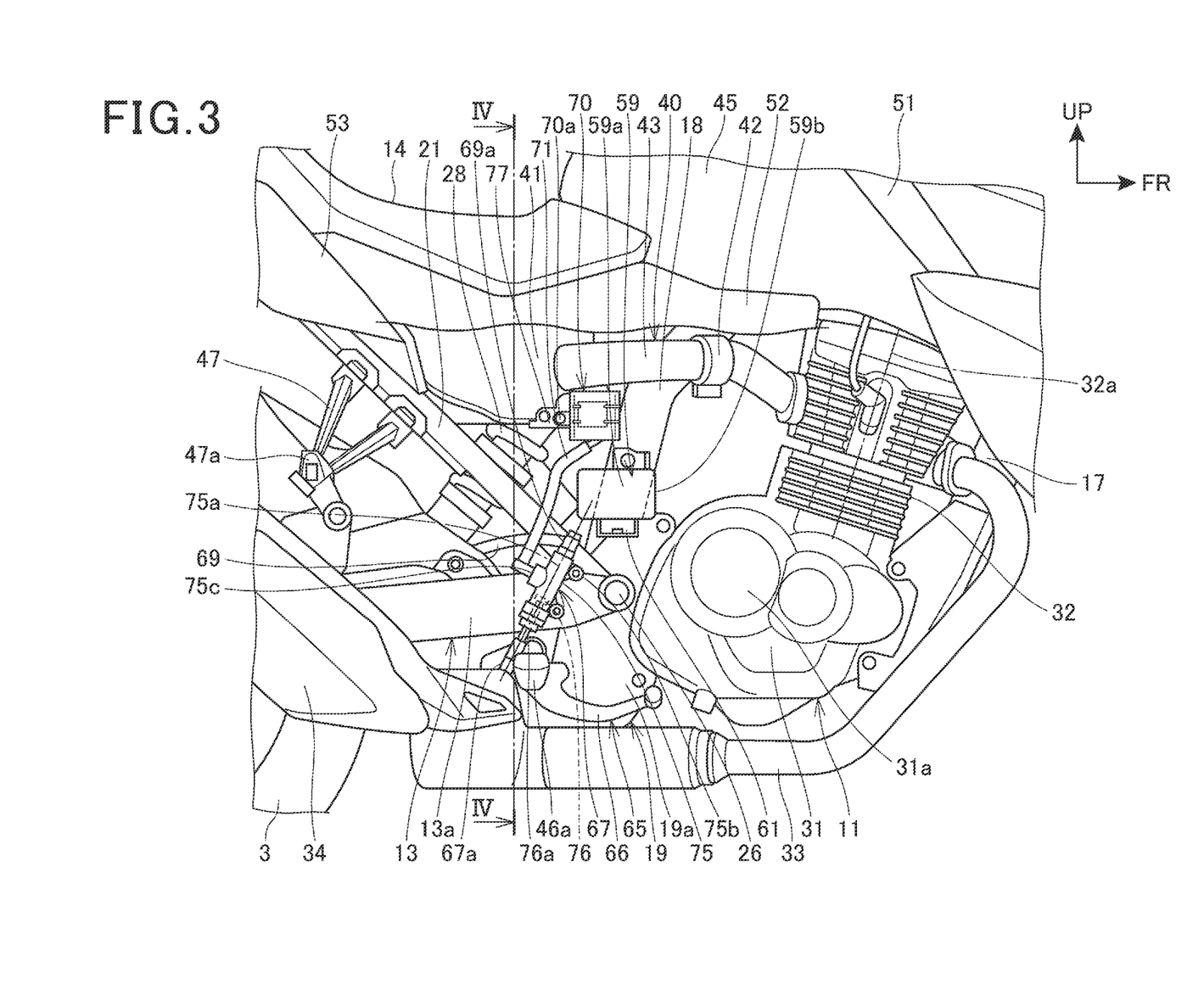
FIG. 3 is a side view of the center part of the motorcycle in the front-rear direction seen from the right side.
Figure 4:
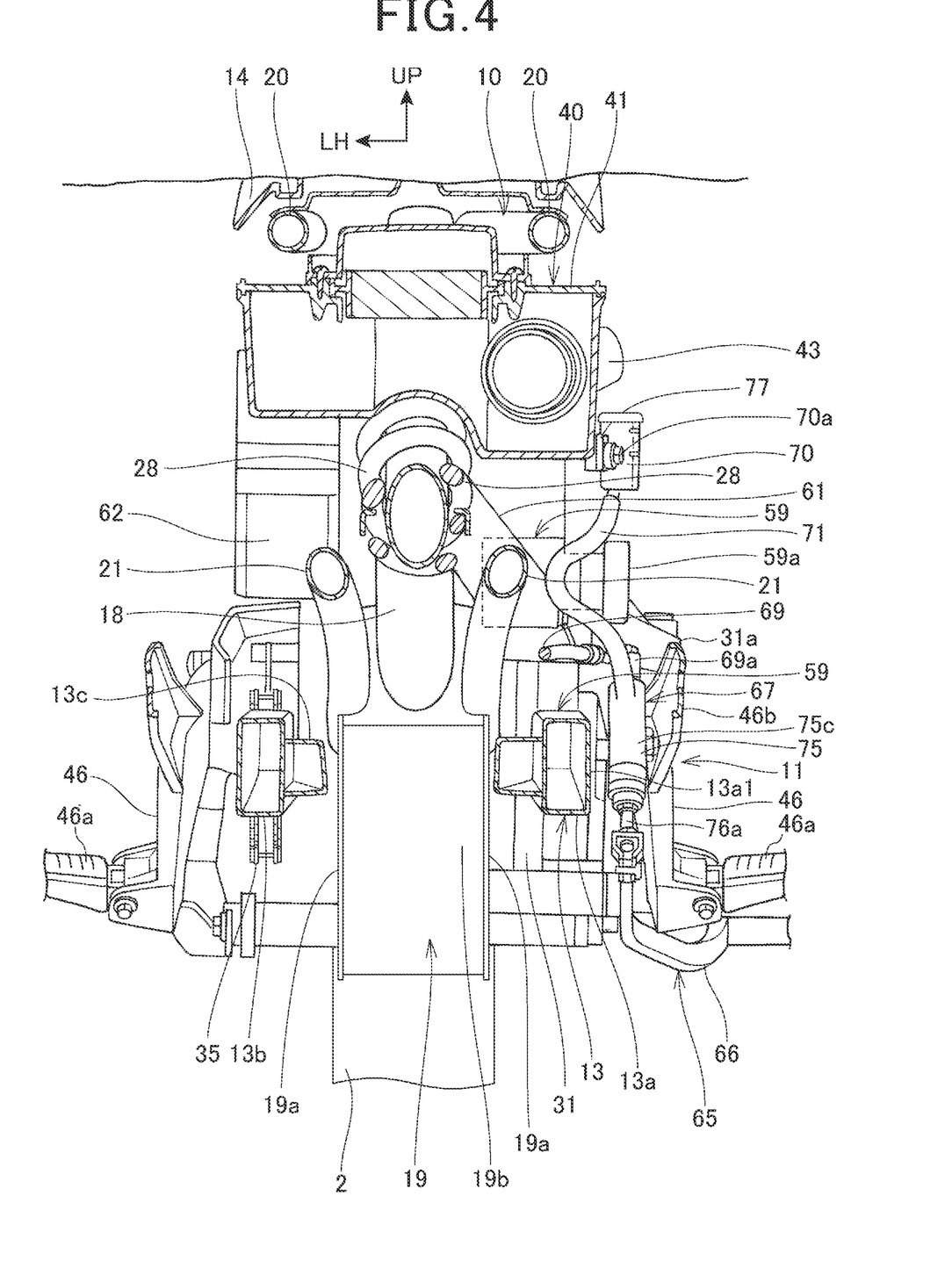
FIG. 4 is a cross-sectional view taken along the IV-IV line of FIG. 3.

FIG. 2 and FIG. 3 are side views of a center part of the motorcycle 1 in a front-rear direction seen from a right side. FIG. 3 shows a state where a part of the vehicle body cover 5 is removed. FIG. 4 is a cross-sectional view taken along the IV-IV line of FIG. 3. FIG. 4 does not show the vehicle body cover 5 and an exhaust tube 33.

With reference to FIG. 1 to FIG. 4, the pivot frame 19 is provided with a pivot shaft 26 extending through the pivot frame 19 in the vehicle width direction. The pivot shaft 26 is provided in an intermediate part of the pivot frame 19 in an up-down direction.

The swing arm 13 comprises an arm part 13a provided on one side (the right side) of the pivot frame 19, an arm part 13b provided on the other side (a left side) of the pivot frame 19, and a cross member 13c (FIG. 4) that connects the arm parts 13a, 13b in a right-left direction.

The swing arm 13 is provided to sandwich the pivot frame 19 between front end portions of the arm parts 13a, 13b from the outside in the vehicle width direction, and the swing arm is swingably supported by the pivot shaft 26 inserted into the front end portions of the arm parts 13a, 13b.

The arm parts 13a, 13b extend rearward from the pivot shaft 26, and the rear wheel 3 is pivoted by an axle 3a disposed across rear end portions of the arm parts 13a, 13b.

An inner fender 27 that covers a front part of the rear wheel 3 from above is attached to an upper surface of the swing arm 13.

A rear suspension 28 is disposed over a space between the swing arm 13 and the rear part of the vehicle body frame 10. The rear suspension 28 extends forward in an upward posture between the right and left subframes 21.

The engine 11 comprises a crank case 31 containing a crank shaft, and a cylinder part 32 extending upward from a front part of the crank case 31. A transmission (not shown) is built-in in a rear part of the crank case 31. In the cylinder part 32, a cylinder axis 32a is inclined forward.

The engine 11 is disposed between the down frame 17 and the pivot frame 19 below the main frame 16, and the crank case 31 is supported by the down frame 17 and the pivot frame 19.

The exhaust tube 33 of the engine 11 extends downward and rearward from a front surface of the cylinder part 32, and extends rearward through a space below the engine 11, to be connected to a muffler 34 disposed on a right side of the swing arm 13.

An output of the engine 11 is transmitted to the rear wheel 3 by a drive chain 35 provided along the left arm part 13b.

An intake device 40 that is an intake system of the engine 11 comprises an air cleaner box 41 (an air cleaner) that takes in outside air, a throttle body 42 connected to an intake port in a rear surface of the cylinder part 32 of the engine 11, and a connecting tube 43 (an intake passage) that connects the air cleaner box 41 and the throttle body 42.

The air cleaner box 41 is disposed in a space surrounded with the center frame 18, the subframe 21 and the seat frame 20 in a vehicle side view. The air cleaner box 41 is disposed behind the rear suspension 28, and as shown in FIG. 4, straddles the rear suspension 28 and the center frame 18 in the right-left direction to extend in the vehicle width direction.

The throttle body 42 is disposed between the cylinder part 32 and the center frame 18 below the main frame 16.

The connecting tube 43 extends forward from a front surface of the air cleaner box 41 through one side (the right side) of an upper part of the center frame 18, to be connected to a rear end of the throttle body 42.

The outside air cleaned in the air cleaner box 41 flows through the connecting tube 43 into the throttle body 42, has a flow rate adjusted in the throttle body 42, and is then supplied to the engine 11.

The pivot frame 19 comprises right and left side plate parts 19a, 19a arranged away from each other in the vehicle width direction, and a rear plate part 19b that connects rear edges of the side plate parts 19a, 19a in the vehicle width direction. Each of the side plate parts 19a, 19a is a plate being long in the up-down direction in the vehicle side view. The center frame 18 extends upward from an upper part of the rear plate part 19b that is inclined forward in the vehicle side view.

The pivot shaft 26 extends through the side plate parts 19a, 19a in the vehicle width direction. The front end portions of the arm parts 13a, 13b are arranged outside the right and left side plate parts 19a, 19a in the vehicle width direction. The subframes 21 extend upward and rearward from the side plate parts 19a, 19a.

A fuel tank 45 is supported by the main frame 16. The seat 14 is supported by the seat frame 20 from below, and extends to a rear end portion of the motorcycle 1 continuously with the fuel tank 45.

A pair of right and left step brackets 46 are attached to outer surfaces of lower parts of right and left side plate parts 19a, 19a of the pivot frame 19, respectively. A pair of right and left steps 46a on which the passenger places feet are supported by the step brackets 46. The step brackets 46 cover the pivot shaft 26 from the outside in the vehicle width direction. FIG. 3 and FIG. 4 do not show the right step bracket 46.

Pillion step brackets 47 that support pillion steps 47a for a fellow passenger are attached to the right and left subframes 21. The muffler 34 is supported by the pillion step brackets 47.

The vehicle body cover 5 comprises a front cover 50 that covers the head pipe 15 from the front, a pair of right and left front side covers 51 that cover a front part of the vehicle body frame 10 from the sides, a pair of right and left side covers 52 that cover lower front parts of the fuel tank 45 and the seat 14, and a pair of right and left rear side covers 53 that cover a lower rear part of the seat 14. A front fender 54 is provided above the front wheel 2. A rear fender 55 is provided above the rear wheel 3.

The motorcycle 1 comprises a front wheel brake device 56 that brakes the front wheel 2, and a rear wheel brake device 65 that brakes the rear wheel 3.

The front wheel brake device 56 comprises a master cylinder 57 for the front wheel into which a passenger's operation is input, a front wheel brake operation part 58 that brakes the front wheel 2 with friction, a braking force adjustment device 59 that controls braking force of the front wheel brake operation part 58, and front wheel brake piping 60 that connects the master cylinder 57 for the front wheel to the braking force adjustment device 59 and that connects the braking force adjustment device 59 to the front wheel brake operation part 58.

The front wheel brake device 56 is a hydraulic type. A passenger's brake operation input via a brake lever 57a of the master cylinder 57 for the front wheel is transmitted as hydraulic pressure to the front wheel brake operation part 58 through the braking force adjustment device 59 and the front wheel brake piping 60.

The front wheel brake operation part 58 comprises a brake disk 58a that rotates integrally with the front wheel 2, and a caliper 58b that presses the brake disk 58a with the hydraulic pressure.

The braking force adjustment device 59 is an anti-lock brake system (ABS) module that controls the hydraulic pressure of the front wheel brake operation part 58 to prevent locking of the front wheel 2.

The braking force adjustment device 59 comprises a pump driven by a motor to adjust the hydraulic pressure, a hydraulic pressure circuit part connected to this pump, a valve that switches this hydraulic pressure circuit part, an electronic controller part that controls the above-described motor, and others. The braking force adjustment device 59 is formed in an almost rectangular box shape in the vehicle side view.

The braking force adjustment device 59 is fixed to the vehicle body frame 10 via a stay 61. The stay 61 is fastened to an upper part of the pivot frame 19, and a side surface of a lower part of the center frame 18. The stay 61 extends outward from the side plate part 19a on the right side (one of right and left sides) of the pivot frame 19, to support the braking force adjustment device 59 from below.

The braking force adjustment device 59 is disposed above the pivot frame 19 and outside the center frame 18. The braking force adjustment device 59 overlaps with the lower part of the center frame 18 from the outside in the vehicle side view, and is disposed outside and beside the center frame 18 in the vehicle width direction.

The braking force adjustment device 59 is disposed behind the crank case 31, in front of the subframe 21 and below the connecting tube 43, in the vehicle side view.

As shown in FIG. 3 and FIG. 4, the braking force adjustment device 59 is disposed above the right arm part 13a of the swing arm 13. In the vehicle width direction, a position where the right arm part 13a is disposed overlaps with a position where the braking force adjustment device 59 is disposed. An outer end portion 59a of the braking force adjustment device 59 in the vehicle width direction is located outside an outer surface 13al of the right arm part 13a at a position of a cross section of FIG. 4.

As shown in FIG. 4, in the vehicle width direction, a battery 62 is disposed on a side opposite to the braking force adjustment device 59 via the center frame 18. The battery 62 and the braking force adjustment device 59 that are heavy objects are arranged separately on left and right sides of the center frame 18, so that good weight balance of the motorcycle 1 in the right-left direction can be obtained.

With reference to FIG. 1 to FIG. 4, the rear wheel brake device 65 comprises a brake pedal 66 into which an operation with a passenger's foot is input, a master cylinder 67 for the rear wheel (a master cylinder) that generates hydraulic pressure with the operation of the brake pedal 66, a rear wheel brake operation part 68 (FIG. 1) that brakes the rear wheel 3 with friction, rear wheel brake piping 69 that connects the master cylinder 67 for the rear wheel to the rear wheel brake operation part 68, a reserve tank 70 that stores brake fluid for the master cylinder 67 for the rear wheel, and a hose 71 that connects the reserve tank 70 to the master cylinder 67 for the rear wheel.

The rear wheel brake device 65 is a hydraulic type, and a brake operation input into the master cylinder 67 for the rear wheel by the brake pedal 66 is transmitted as hydraulic pressure to the rear wheel brake operation part 68 through the rear wheel brake piping 69.

The rear wheel brake operation part 68 comprises a brake disk 68a that rotates integrally with the rear wheel 3, and a caliper 68b that presses the brake disk 68a with the hydraulic pressure.

In a case where it is considered that the center frame 18 located at the center in the vehicle width direction is a reference, the rear wheel brake device 65 is disposed on the same side as a side on which the braking force adjustment device 59 is disposed in the vehicle width direction, that is, on the right side of the center frame 18.

The master cylinder 67 for the rear wheel comprises a tubular cylinder part 75 extending in the up-down direction in the vehicle side view, and a piston 76 that makes stroke in the cylinder part 75 to generate the hydraulic pressure.

The master cylinder 67 for the rear wheel is disposed in a posture in which an axis 75a of the cylinder part 75 is inclined forward in the vehicle side view. The forward inclination of the axis 75a is closer to vertical than to horizontal.

The cylinder part 75 has a front surface part comprising a pair of upper and lower fixing parts 75b in the vehicle side view. The master cylinder 67 for the rear wheel is attached to the right step bracket 46 (FIG. 2) by a fixture (not shown) such as a bolt inserted into each fixing part 75b.

The step bracket 46 comprises a plate-like cover part 46b (a cover) extending upward and rearward from a part of the step bracket 46 which covers the pivot shaft 26 from the outside. With reference to FIG. 2 and FIG. 3, in the vehicle side view, the cover part 46b overlaps with the master cylinder 67 for the rear wheel from the outside, and covers the cylinder part 75, the fixing part 75b, an after-mentioned hose connecting part 75c, and a lower end portion of the hose 71 from the outside in the vehicle width direction.

A front end 69a of the rear wheel brake piping 69 is connected to an upper end portion of the cylinder part 75. The rear wheel brake piping 69 extends rearward along the right arm part 13a, and has a rear end connected to the caliper 68b (FIG. 1).

In a rear surface portion of the cylinder part 75, the hose connecting part 75c is provided to which the lower end portion of the hose 71 is connected.

The piston 76 comprises a rod 76a extending downward from a lower end of the cylinder part 75. The piston 76 is connected to a rear end portion of the brake pedal 66 via a lower end portion of the rod 76a.

The brake pedal 66 is disposed below the cylinder part 75, and is rotationally movably pivoted by the vehicle body. The brake pedal 66 is disposed below the right arm part 13a and outside a lower end portion of the side plate part 19a.

When the passenger steps on a front end portion of the brake pedal 66, the piston 76 makes an upward stroke via the rod 76a, to generate the hydraulic pressure.

In the vehicle side view, the master cylinder 67 for the rear wheel is disposed behind the pivot frame 19 and outside the right arm part 13a, and overlaps with the front end portion of the arm part 13a from the outside in the vehicle width direction. The master cylinder 67 for the rear wheel is disposed in front of the muffler 34 and behind the pivot shaft 26.

The master cylinder 67 for the rear wheel is disposed below and behind the braking force adjustment device 59. In the vehicle side view, an upper end of the master cylinder 67 for the rear wheel is located below a lower surface of the braking force adjustment device 59.

The reserve tank 70 has an almost rectangular container shape in a side view, and is smaller than the braking force adjustment device 59 in the vehicle side view.

The reserve tank 70 is disposed above the braking force adjustment device 59, and below the connecting tube 43, in the vehicle side view. That is, the reserve tank 70 is disposed between the connecting tube 43 and the braking force adjustment device 59 in the up-down direction. Furthermore, the reserve tank 70 is disposed behind the center frame 18, and in front of the subframe 21, in the vehicle side view. The reserve tank 70 is located in front of the rear suspension 28.

The reserve tank 70 is disposed outside the center frame 18 in the vehicle width direction.

The reserve tank 70 is attached to a reserve tank stay 77 provided in an outer surface portion of a front part of the air cleaner box 41, and supported by the air cleaner box 41 via the reserve tank stay 77.

The reserve tank stay 77 is disposed below a rear end portion of the connecting tube 43. The reserve tank 70 is fixed to the reserve tank stay 77 by a bolt 70a provided in a rear part of the tank. The reserve tank 70 is located outside the air cleaner box 41 in the vehicle width direction.

The hose 71 extends upward and forward from the hose connecting part 75c of the master cylinder 67 for the rear wheel through behind the braking force adjustment device 59. An upper end of the hose 71 is connected to a lower surface part of the reserve tank 70.

The reserve tank 70 is disposed above the master cylinder 67 for the rear wheel, and the brake fluid stored in the reserve tank 70 descends through the hose 71 due to gravity, and is supplied to the master cylinder 67 for the rear wheel.

With reference to FIG. 3 and FIG. 4, the reserve tank 70, the braking force adjustment device 59 and the master cylinder 67 for the rear wheel are offset and arranged on one side of the center frame 18 in the vehicle width direction.

The reserve tank 70, the braking force adjustment device 59 and the master cylinder 67 for the rear wheel are arranged to line up in the up-down direction. Consequently, the reserve tank 70, the braking force adjustment device 59 and the master cylinder 67 for the rear wheel can be arranged compactly in the front-rear direction.

In the vehicle side view, the braking force adjustment device 59 is disposed between the master cylinder 67 for the rear wheel and the reserve tank 70 in the up-down direction. Consequently, a space between the master cylinder 67 for the rear wheel and the reserve tank 70 can be used to dispose the braking force adjustment device 59 compactly.

In the vehicle side view, the reserve tank 70 is disposed in front of a rear end 67a of the master cylinder 67 for the rear wheel, and disposed behind a front end 59b of the braking force adjustment device 59.

As shown in FIG. 4, the outer end portion 59a of the braking force adjustment device 59 in the vehicle width direction is located at the same position as the reserve tank 70 in the vehicle width direction. That is, in the vehicle width direction, a part of a position where the reserve tank 70 is disposed overlaps with the position where the braking force adjustment device 59 is disposed. Consequently, the reserve tank 70 and the braking force adjustment device 59 can be arranged compactly in the vehicle width direction.

As seen from above, the reserve tank 70 overlaps with the braking force adjustment device 59 from above.

Furthermore, the master cylinder 67 for the rear wheel is offset and disposed outside the braking force adjustment device 59 in the vehicle width direction, and the outer end portion 59a of the braking force adjustment device 59 in the vehicle width direction is located at the same position as the master cylinder 67 for the rear wheel in the vehicle width direction. That is, in the vehicle width direction, a part of a position where the master cylinder 67 for the rear wheel is disposed overlaps with the position where the braking force adjustment device 59 is disposed. Consequently, the master cylinder 67 for the rear wheel and the braking force adjustment device 59 can be arranged compactly in the vehicle width direction.

Additionally, in the vehicle width direction, the reserve tank 70, the braking force adjustment device 59 and the master cylinder 67 for the rear wheel are located inside an outer end portion 31a of the crank case 31 in the vehicle width direction and the step 46a. Consequently, the outer end portion 31a of the crank case 31 and the step 46a can protect the reserve tank 70, the braking force adjustment device 59 and the master cylinder 67 for the rear wheel.

With reference to FIG. 1 to FIG. 3, the passenger who sits on the seat 14 extends a passenger's leg downward from the seat 14, and places the foot on the step 46a. That is, in the up-down direction, a part from the front part of the seat 14 to the step 46a is a side part 1a covered with the passenger's leg from the outside in the vehicle width direction. The side part 1a includes the side cover 52 and the step bracket 46. In the present embodiment, the reserve tank 70, the braking force adjustment device 59 and the master cylinder 67 for the rear wheel are arranged inside the side part 1a. The reserve tank 70, the braking force adjustment device 59 and the master cylinder 67 for the rear wheel are arranged to overlap with one another in the vehicle width direction as described above, and are therefore arranged compactly in the vehicle width direction. Consequently, the side part 1a can be provided compactly in the vehicle width direction, and passenger's footing properties improve. Furthermore, the reserve tank 70, the braking force adjustment device 59 and the master cylinder 67 for the rear wheel can be hidden with the side cover 52 and the step bracket 46, and appearance improves.

As described above, according to the embodiment to which the present invention is applied, the motorcycle 1 comprises the braking force adjustment device 59 that controls the braking force of the front wheel 2, the master cylinder 67 for the rear wheel which outputs the brake hydraulic pressure in response to the operation of the brake pedal 66, and the reserve tank 70 that stores the brake fluid for the master cylinder 67 for the rear wheel, and in the vehicle side view, the reserve tank 70 is disposed above the master cylinder 67 for the rear wheel, and the braking force adjustment device 59 is provided between the master cylinder 67 for the rear wheel and the reserve tank 70. According to this configuration, in the vehicle side view, the reserve tank 70, the braking force adjustment device 59 and the master cylinder 67 for the rear wheel are arranged to line up in the up-down direction, and hence the reserve tank 70, the braking force adjustment device 59 and the master cylinder 67 can be arranged compactly in the vehicle front-rear direction.

Furthermore, the master cylinder 67 for the rear wheel is disposed to be inclined forward, and the reserve tank 70 is disposed in front of the rear end 67a of the master cylinder 67 for the rear wheel. According to this configuration, the master cylinder 67 for the rear wheel can be inhibited from being projected rearward, and the master cylinder 67 for the rear wheel can be disposed compactly in the front-rear direction. Additionally, the reserve tank 70 can be compactly disposed in front of the rear end 67a of the master cylinder 67 for the rear wheel. In this case, a space between the rear wheel 3 and the subframe 21 can look cleaner, and appearance improves more, for example, as compared with a case where the reserve tank 70 is disposed between the rear wheel 3 and the subframe 21 as a seat rail that supports the seat 14.

Furthermore, in the vehicle width direction, at least a part of the position where the reserve tank 70 is disposed overlaps with the position where the braking force adjustment device 59 is disposed. According to this configuration, the reserve tank 70 and the braking force adjustment device 59 can be arranged compactly in the vehicle width direction.

Furthermore, in the vehicle width direction, at least a part of the position where the master cylinder 67 for the rear wheel is disposed overlaps with the position where the braking force adjustment device 59 is disposed. According to this configuration, the master cylinder 67 for the rear wheel and the braking force adjustment device 59 can be arranged compactly in the vehicle width direction.

Additionally, the reserve tank 70 is supported by the air cleaner box 41 of the intake device 40. According to this configuration, the reserve tank 70 can be supported with a simple structure by use of the air cleaner box 41.

Furthermore, provided is the connecting tube 43 extending forward from the air cleaner box 41, and the reserve tank 70 is disposed below the connecting tube 43. According to this configuration, the reserve tank 70 can be provided compactly by using a space below the connecting tube 43.

Additionally, the vehicle body frame 10 includes the pivot frame 19 to which the swing arm 13 that supports the rear wheel 3 is coupled. The swing arm 13 is provided to sandwich the pivot frame 19 between the right and left right arm parts 13a, 13b from the outside in the vehicle width direction, the braking force adjustment device 59 is disposed above the arm part 13a that is one of the right and left arm parts 13a, 13b, and in the vehicle width direction, at least a part of the position where the arm part 13a is disposed overlaps with the position where the braking force adjustment device 59 is disposed. According to this configuration, the braking force adjustment device 59 can be disposed compactly in the vehicle width direction by use of a space above the arm part 13a outside the pivot frame 19 in the vehicle width direction.

Furthermore, the master cylinder 67 for the rear wheel is disposed below the braking force adjustment device 59, and outside the one arm part 13a. According to this configuration, the master cylinder 67 for the rear wheel can be compactly disposed below the braking force adjustment device 59, and outside the arm part 13a.

Additionally, provided is the cover part 46b that overlaps with the master cylinder 67 for the rear wheel from the outside in the vehicle width direction in the vehicle side view. According to this configuration, the cover part 46b can protect the master cylinder 67 for the rear wheel, and appearance can improve in such a manner that the master cylinder 67 for the rear wheel is hidden.

Note that the above embodiment illustrates one aspect to which the present invention is applied, and the present invention is not limited to the above embodiment.

In the above embodiment, the braking force adjustment device 59 is provided for the front wheel brake device 56, but the present invention is not limited to this example. The braking force adjustment device may be, for example, provided for the rear wheel brake device 65.

Furthermore, the motorcycle 1 has been described as an example of the saddle riding type vehicle, but the present invention is not limited to this example, and the present invention is applicable to a three-wheel saddle riding type vehicle comprising two front or rear wheels or a saddle riding type vehicle comprising four or more wheels.

REFERENCE SIGN LIST 1 motorcycle (saddle riding type vehicle)
2 front wheel (vehicle wheel)
3 rear wheel
10 vehicle body frame
13 swing arm
13a arm part (one of arm parts)
13b arm part
19 pivot frame
40 intake device (intake system)
41 air cleaner box (air cleaner)
43 connecting tube (intake passage)
46b cover part (cover)
59 braking force adjustment device
66 brake pedal
67 master cylinder for the rear wheel (master cylinder)
67a rear end
70 reserve tank

The invention claimed is:

1. A saddle riding vehicle comprising:
   a braking force adjustment device that controls braking force of a vehicle wheel,
   a master cylinder that outputs brake hydraulic pressure in response to operation of a brake pedal, and
   a reserve tank that stores brake fluid for the master cylinder, wherein in a vehicle side view, the reserve tank is disposed above the master cylinder, and the braking force adjustment device is provided between the master cylinder and the reserve tank,
   the reserve tank is supported by an air cleaner of an intake system,
   the saddle riding vehicle further comprises an intake passage extending forward from the air cleaner, and
   the reserve tank is disposed below the intake passage.

2. The saddle riding vehicle according to claim 1, wherein the master cylinder is disposed to be inclined forward, and the reserve tank is disposed in front of a rear end of the master cylinder.

3. The saddle riding vehicle according to claim 1, further comprising:
   a cover that overlaps with the master cylinder from an outside in a vehicle width direction in the vehicle side view.

4. The saddle riding vehicle according to claim 1, wherein in a vehicle width direction, at least a part of a position where the master cylinder is disposed overlaps with a position where the braking force adjustment device is disposed.

5. The saddle riding vehicle according to claim 1, wherein in a vehicle width direction, at least a part of a position where the reserve tank is disposed overlaps with a position where the braking force adjustment device is disposed.

6. The saddle riding vehicle according to claim 5, wherein a side cover overlaps with the reserve tank and the braking force adjustment device in the vehicle side view.

7. The saddle riding vehicle according to claim 1, further comprising:
   a vehicle body frame including a pivot frame to which a swing arm that supports a rear wheel is coupled,
      wherein the swing arm is provided to sandwich the pivot frame between right and left arm parts from an outside in a vehicle width direction,
   the braking force adjustment device is disposed above one of the right and left arm parts, and
   in the vehicle width direction, at least a part of a position where one of the arm parts is disposed overlaps with a position where the braking force adjustment device is disposed.

8. The saddle riding vehicle according to claim 7, wherein the master cylinder is disposed below the braking force adjustment device and outside one of the arm parts.

* * * * *